(12) United States Patent
Swerup et al.

(10) Patent No.: US 7,865,197 B2
(45) Date of Patent: Jan. 4, 2011

(54) MESSAGE HANDLING IN PORTABLE ELECTRONIC DEVICE

(75) Inventors: Jan Swerup, Nacka (SE); Maurice Labiche, Stockholm (SE)

(73) Assignee: Sony Ericsson Mobile Communications AB, Lund (SE)

( * ) Notice: Subject to any disclaimer, the term of this patent is extended or adjusted under 35 U.S.C. 154(b) by 916 days.

(21) Appl. No.: 10/576,474

(22) PCT Filed: Sep. 22, 2004

(86) PCT No.: PCT/EP2004/010613
§ 371 (c)(1),
(2), (4) Date: Apr. 20, 2006

(87) PCT Pub. No.: WO2005/041545
PCT Pub. Date: May 6, 2005

(65) Prior Publication Data
US 2007/0123278 A1    May 31, 2007

(30) Foreign Application Priority Data
Oct. 23, 2003    (EP)    .................................. 03024287

(51) Int. Cl.
*H04W 4/00*    (2009.01)
(52) U.S. Cl. ....................................................... 455/466
(58) Field of Classification Search ............... 379/93.01; 455/412.1, 466
See application file for complete search history.

(56) References Cited
U.S. PATENT DOCUMENTS
6,151,507 A    11/2000    Laiho et al. .................. 455/466

| | | | | |
|---|---|---|---|---|
| 6,697,942 B1 * | 2/2004 | L'Heureux et al. | ........... | 713/152 |
| 7,212,808 B2 * | 5/2007 | Engstrom et al. | ......... | 455/412.1 |
| 2002/0159600 A1 | 10/2002 | Weiner | ....................... | 380/270 |
| 2004/0203610 A1 * | 10/2004 | Deeds | ..................... | 455/412.1 |

FOREIGN PATENT DOCUMENTS
EP    1 150 478 A1    10/2001
JP    2001-109713 A    4/2001

OTHER PUBLICATIONS

"Siemens C45 User Guide passage", Siemens C45 User Guide, pp. 1-81, XP002221958, 2001.
International Search Report mailed on Jan. 25, 2005.
International Preliminary Report on Patentability mailed on Dec. 1, 2005.

* cited by examiner

*Primary Examiner*—Alexander Jamal
(74) *Attorney, Agent, or Firm*—Harrity & Harrity, LLP

(57) ABSTRACT

The present invention is directed towards a method and a device for preparing a message in a portable electronic device such as a cellular phone. The device comprises a message type selection unit (14) providing a set of items of message types (20, 22, 24, 26, 28) that can be selected by a user, a first user input unit (32), for allowing message type selection by the user, and a control unit (40) arranged to: provide the set of items of message types (20, 22, 24, 26) that can be selected by a user, detect a message selection by a user via said user input unit (32), change transmission format in dependence of the selections made by the user. In this way for instance a message can be prepared and saved in advance of deciding final message type for transmission.

20 Claims, 2 Drawing Sheets

MESSAGE HANDLING IN PORTABLE ELECTRONIC DEVICE

TECHNICAL FIELD OF THE INVENTION

The present invention relates to the field of message handling in portable electronic devices.

DESCRIPTION OF RELATED ART

Portable electronic devices such as cellular phones of today have more and more different message types that can be transmitted, and each one of them has its own characteristics. Examples of message types are for instance: SMS for text messages, EMS for graphic information, MMS for multimedia messages including sound and pictures, "computer related" messages such as e-mail with or without attachment file and blogging for storing messages on a web site.

In the cellular phones of today, when a user prepares a message, an editor is used to prepare the message. Before starting to prepare the message, firstly the user has to decide which type of message is going to be prepared, for instance that a SMS will be prepared, whereby a proper editor is selected. The user is then restricted to this type of message and its corresponding features including its limitations. For instance, if a SMS has been prepared, it is normally not possible to transform it into an e-mail and vice versa. This of course is a disadvantage, because the user may not before or even at the time of preparing the message know what type of message he will finally end up with. He may not even know who will be the receiver thereof. Yet another disadvantage is that the user cannot save the message before knowing the final format it will have.

The patent literature, for instance, describes solutions for converting messages from one format into another, for example SMS to MMS, as disclosed for instance in WO-A1-02/096046 describing a computer workstation. However, common for all solutions is that the conversion is performed centrally in a system and not in the portable electronic device itself.

Thus, several disadvantages remain with today's technology concerning preparing and saving messages, for instance by means of the conventional editors located in the portable electronic devices.

There is thus a need for providing a user to be able to compose and save a message in advance of deciding what type of message it will end up in. In particular, there is a need for providing an editor for a portable electronic device that can be fully controlled by a user in a simple manner, which editor provides preparing and saving a message in advance of deciding final message type for transmission (or saving thereof).

SUMMARY OF THE INVENTION

The present invention is thus directed towards providing an editor for a portable electronic device that can be fully controlled by a user in a simple manner such that a message can be prepared and saved in advance of deciding final message type for transmission.

This is achieved by providing an editor common for all message types, detecting a message type selection for a user, and changing appearance on a display and a transmission format in dependence of the selections made by the user. The editor is provided in the portable electronic device.

One object of the present invention is to provide a method enabling a user to prepare and save a message in a portable electronic device in advance of deciding final message type for transmission.

According to a first aspect of the present invention, this object is achieved by a method of preparing a message in a portable electronic device, comprising the steps of:

providing a set of message types that can be selected by a user in an editor common for all message types, detecting a message type selection for a user, and changing transmission format in dependence of the selections made by the user.

A second aspect of the present invention is directed to a method including the features of the first aspect, further comprising the step of showing the message, typically on an information presentation unit, in a format corresponding with the selected message type.

A third aspect of the present invention is directed towards a method including the features of the first aspect, wherein a first user input unit allows actuation for and scrolling in a first direction and a second opposite direction, wherein the detection of a selection by an actuation and confirmation of the first input unit for one direction provides selection of a message type and the detection of a selection provides changing the appearance and transmission format in dependence of the selections made by the user.

A fourth aspect of the present invention is directed towards a method including the features of the sixth aspect, comprising the step of saving, preferably performed automatically.

A fifth aspect of the present invention is directed towards a method including the features of the fourth aspect, wherein the step of saving is performed in a general format.

Another object of the present invention is to provide a portable electronic device, which provides a user to prepare and/or save a message in advance of deciding final message type for transmission.

According to a sixth aspect of the present invention, this object is achieved by a device for preparing a message in a portable electronic device comprising:

a message type selection unit providing a set of items of message types that can be selected by a user, a user input unit for allowing message type selection by the user, and a control unit arranged to:

provide the set of message types that can be selected by a user in an editor having a format common for all message types, detect a message selection by a user via said user input unit, change the transmission format in dependence of the selections made by the user.

An seventh aspect of the present invention is directed towards a device including the features of the sixth aspect, wherein the first user input unit allows actuation for and scrolling in a first direction and a second opposite direction, and a second user input unit is arranged to confirm a selection, wherein the detection of a selection by an actuation of the first input unit for one direction to an item and confirmation by the second input unit provides selection of a message type and the detection of a selection provides changing transmission format in dependence of the selections made by the user.

An eight aspect of the present invention is directed towards a device including the features of the seventh aspect, wherein the control unit is arranged to change the appearance on an information presentation unit in dependence of the selections made by the user.

A ninth aspect of the present invention is directed towards a device including the features of any one of the sixth to the seventh aspects, further comprising a message store and wherein the control unit is further arranged to save a message in the message store based on information present in the common editor.

A tenth aspect of the present invention is directed towards a device including the features of any one of the sixth to the ninth aspect, wherein the control unit is arranged to automatically save the message in a general format.

An eleventh aspect of the present invention is directed towards a device including the features of any one of the sixth aspect to the tenth aspect, wherein the control unit is arranged to upload the message to a predefined web-address.

A twelfth aspect of the present invention is directed towards a device including the features of any one of the sixth aspect to the tenth aspect, wherein the control unit is arranged to upload the message to a predefined web-address with automated log-in.

A thirteenth aspect of the present invention is directed towards a device including the features of any one of the sixth aspect to the tenth aspect, wherein the control unit is arranged to upload the message to a predefined web-address without automated log-in.

A fourteenth aspect of the present invention is directed towards a device including the features of any one of the sixth to the tenth aspect, wherein irrelevant tools is arranged not to be selectable so that a user can continue to edit in the format selected only.

A fifteenth aspect of the present invention is directed towards a device including the features of any one of the sixth to the tenth aspect, wherein the first user input unit is provided as at least one button of the device normally used for navigating in a menu system of the device.

A sixteenth aspect of the present invention is directed towards a device including the features of any one of the sixth to the fifteenth aspect, wherein the device is an electronic communication device.

A seventeenth aspect of the present invention is directed towards a device including the features of any one of the sixth to the sixteenth aspect, wherein the device is a cellular phone, a PDA or a smart-phone.

The invention has many advantages. According to the first to the fifteenth aspect of the present invention, a user will be able to compose messages, notes and other text matter using one and the same editor. This will give the user complete freedom when thinking and editing. He will not have to restrict himself until he finally sends the message. The invention has the further advantage providing storing of the message in a format common for all message types.

The invention is also very inexpensive to implement, because it can be implemented using the user input selection unit already provided in the device and the common editor function/temporary unavailable function can be provided with just some extra software in addition to the editor and/or messaging software already existing.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

Figure 1:
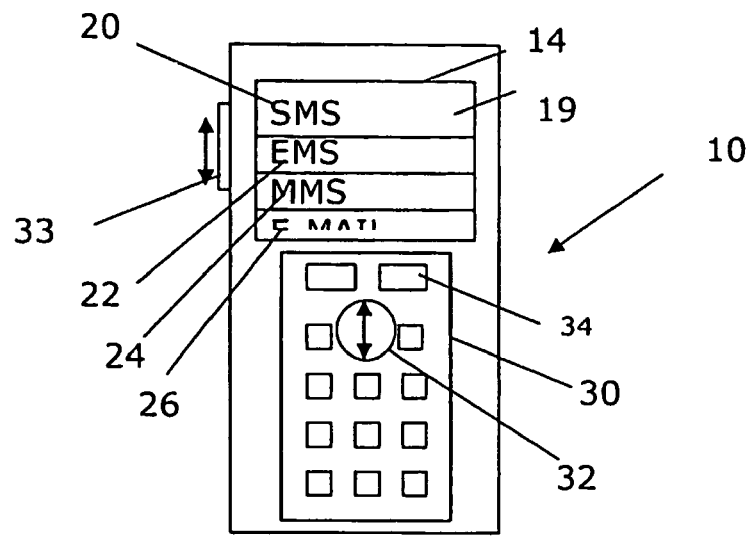
FIG. 1 shows a front view of a portable electronic device in the form of a cellular phone.

A portable electronic device into which the invention can be implemented is shown in FIG. 1, which here is a portable electronic device shown in a front view. Preferably, the portable electronic device is a cellular phone 10 having an antenna (not shown) for communication with other users via a network, an information presentation unit 14 in the form of a display, showing a set of items of message types 20, 22, 24, 26 that can be selected by a user in an editor common for all message types. The cellular phone 10 further comprises a keypad 30 comprising first user input unit 32, herein in the form of a navigation key, for scrolling up and down in menus to highlight an item and a second user input unit 34 for confirming the selected item 20, 22, 24, 26. The navigation key 32 and the confirmation key 34, and the function thereof are known per se and will therefore not be further described. The first and second user input units 32, 34 may also be combined in the first user input unit 32, provided a confirmation of a selected item 20, 22, 24, 26 can be made in some way. Alternatively, or in addition, the first user input unit 32 can also be provided in a volume button 33. The volume button 33 can be actuated in an upward direction and in an opposite downward direction, which is indicated by an arrow pointing in both these directions in the figure.

The first user input unit 32 allows actuation for a first direction and a second opposite direction (illustrated by a double-headed arrow), each also allowing scrolling in said direction, wherein a control unit (shown in FIG. 2) in detecting a selection by actuation of the first input unit 32 to a selected item 20, 22, 24, 26 (typically by highlighting the same) and confirming the selection by the second input unit 34, for instance by pushing a key of the keypad 30, thereby activating a switch (not shown) in a way known per se. The input unit(s) may also be provided in the form of a touch screen in a way known per se.

Apart from making and receiving telephone calls, the keypad 30 is used for entering message information such as a text, selecting conventional functions and applications. Functions and applications are typically selected by the navigation key 32, which can be used for navigating up and down through a menu system provided in the phone 10. In the menu system, sets of items are provided in the form of lists. In FIG. 1 one such list 19 of items 20, 22, 24, 26 is shown. The list 19 is here a list of message types. In FIG. 1 the list is shown as having a first item 20, for SMS, a second item 22, for e-mail, a third item 24, for blogging. Part of a fourth item 26, which cannot be fully seen, is also shown for illustrative purposes.

A list 19 can include as much as 10 message types (or even more) typically including at least the following:

SMS for text messages, EMS for graphic information, MMS for multi-media messages including pictures, computer related messages such as e-mail with or without attachment file, blogging for storing messages on a web site, and reduced type of MMS conforming to a minimum standard.

Figure 2:
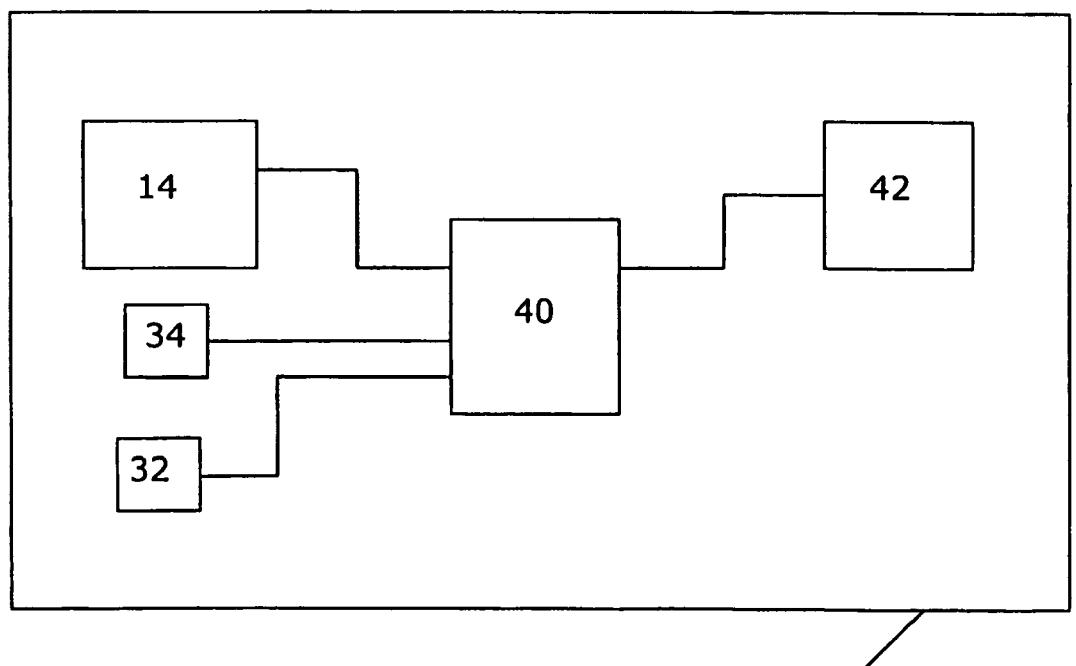
FIG. 2 shows a block schematic of the relevant parts according to an embodiment of the invention inside the phone in FIG. 1.

FIG. 2 shows a block schematic of the different parts of the phone 10 relevant to the present invention. The display 14, the first user input unit 32 and the second user input unit 34 are here shown as separate boxes connected to a control unit 40. The control unit 40 is furthermore connected to a store 42.

The control unit 40 is normally provided in the form of one or more processors with corresponding program memories containing suitable software code, and the store 42 is preferably provided in the form of a memory known per se, for instance a semi-conductor memory.

Figure 3:
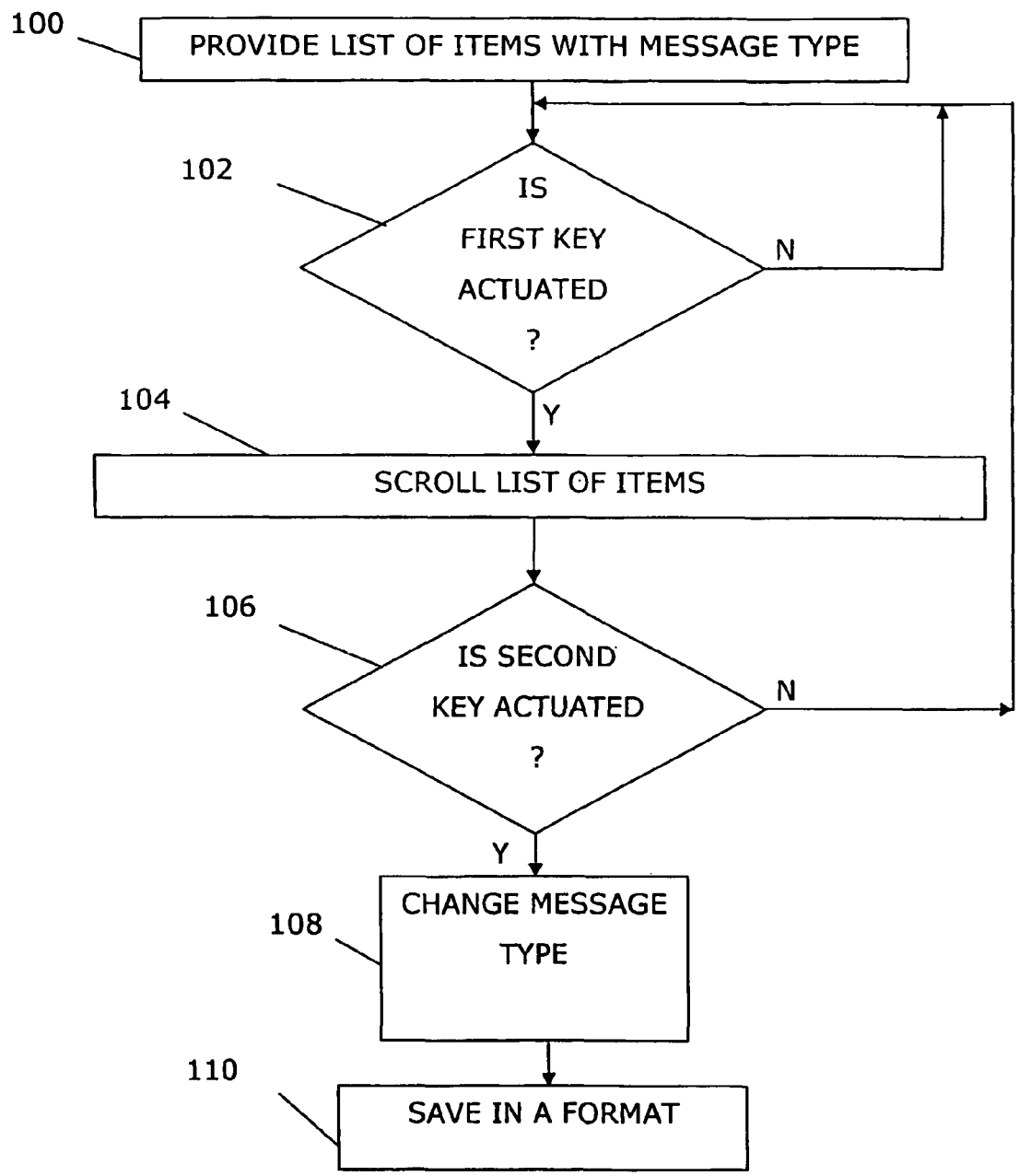
FIG. 3 shows a flow chart of a method according to an embodiment of the invention.

A preferred embodiment of the present invention will now be explained with reference to FIGS. 1, 2 and 3.

In an editor, or alternatively after selecting the temporary unavailable function (it is assumed that editing mode for preparing messages is already selected in a way known per se) common for all message types, upon the selection of a list of items in the menu system of the phone, the control unit 40 retrieves the list of items 20, 22, 24, 26 and presents it on the display 14, step 100. The control unit 40 thereafter awaits a selection through inputs from the user via the first input unit, in this case the navigation key 32. If the navigation key 32 is not actuated or depressed, the control unit 40 continues to wait, step 102. If however the navigation key 32 is actuated, step 104, the control unit 40 goes on and scrolls the list 19, step 104. This scrolling is performed as long as the navigation key 32 is actuated or depressed.

The navigation key 32 enables the possibility to navigate in an upward direction and in a downward direction as is indicated by the arrow pointing in two directions in FIG. 1. This means that if a lower part of the key 32 is depressed, scrolling is made downwards, while if an upper part is depressed scrolling is performed in a direction upwards.

If, step 106, a second input unit 34, typically a second key is not actuated, the control unit 40 goes back and monitors the navigation key, step 102. This method is then continued as long as the user has not selected an item 20, 22, 24, 26 in the list 19.

When one of the items 20, 22, 24, 26 has been selected, for instance by the user confirming selection by pushing on the second user input unit, 34, a second key, in a way known per se, message type selection is detected, step 108, and transmission format is changed in dependence of selections made by the user, which selection may thereafter be used for graying out irrelevant tools which can be selected, typically from a menu, in a way known per se.

Typically, the message is automatically stored in a general format in the store 42 by the control unit 40, step 110, for instance up to a point when it is being sent. It may of course well be that the user wants to change to another format, or add another receiver who has more possible options.

Preferably, even when the message has been sent, it is better to save in a general format with a data item indicating how it was sent. The user may also after sending wish to add another user which can receive the message in a richer format.

The present invention has many advantages. Common for all embodiments of the present invention, is that message preparation is performed in the portable electronic device itself, not centrally by a system. It allows a user to use a common editor for all types of messages, which he would not otherwise have.

The invention is also very inexpensive to implement. By providing the scroll speed control with the navigation key, there is furthermore no need for any additional buttons or keys on the phone and the message variation function can be provided with just some extra software in addition to the scrolling software already existing.

The present invention can be varied in many ways. The keys described were keys, where one key or button can be used for indicating two directions. It is of course also possible to provide this functionality with two separate keys or buttons instead. The navigation key was furthermore described in relation to providing navigation in only upwards and downwards directions. Naturally it is also possible to provide navigation sideways. It should also be understood that the scrolling control according to the invention could also be performed for scrolling sideways. The invention is of course not limited to these types of buttons or keys at all, but can be used with any keys provided on a device.

The invention was described in relation to a cellular phone. A cellular phone is just one example of a device in which the invention can be implemented. The invention can for instance also be used in a PDA (personal digital assistant), a palm top computer a lap top computer and a regular PC. Therefore the present invention is only to be limited by the following claims.

The invention claimed is:

1. A method of preparing a message in an electronic communication device, the method comprising
   providing, via a display of the electronic communication device, a set of message types that can be selected by a user in an editor common for all message types of a plurality of message types;
   detecting, via a control unit of the electronic communication device, a user selection of a particular message type of the plurality of message types, where the particular message type is a message type other than a Short Message Service (SMS) message type;
   receiving the message in the editor;
   selecting, via the control unit, a transmission format for the message in dependence of the user selection, where the message is received in advance of the changing the transmission format; and
   outputting, from the electronic communication device, the message using the selected transmission format.

2. The method according to claim 1, further comprising displaying the message on an information presentation unit in a format corresponding with the selected message type.

3. The method according to claim 1, where a first user input unit allows actuation for and scrolling in a first direction and a second opposite direction, where detection of a selection by an actuation and confirmation of the first user input unit for one direction provides selection of a message type and the detection of the selection provides changing the transmission format.

4. The method according to claim 1, further comprising saving the message.

5. Device for preparing a message in an electronic communication device comprising:
   a message type selection unit providing a set of message types that can be selected by a user,
   a first user input unit, for allowing message type selection by the user, and
   a control unit arranged to:
      provide the set of items of message types that can be selected by a user in an editor having a format common for all message types,
      detect a message selection by a user via said first user input unit,
      change a transmission format in dependence of the selections made by the user which provides preparing and saving a message in advance of deciding final message type for transmission or saving thereof.

6. Device according to claim 5, where the first user input unit allows actuation for and scrolling in a first direction and a second opposite direction, and a second user input unit is to confirm a selection, where the detection of a selection by an actuation of the first user input unit for one direction to an item and confirmation by the second user input unit provides selection of a message type and the detection of a selection provides changing the transmission format in dependence of the selections made by the user.

7. Device according to claim 5, where the control unit is to change the appearance on an information presentation unit in dependence of the selections made by the user.

8. Device according to claim 5, further comprising a user selectable store to store a message, where the control unit is further to save a message in the store in a general format.

9. Device according to claim 8, where the control unit is to automatically save the message in the store.

10. Device according to claim 5, where the control unit is to upload the message to a predefined web address.

11. Device according to claim 5, where the control unit is to upload the message to a web address using an automated log-in.

12. Device according to claim 5, where the control unit is to upload the message to a web address without using an automated log-in.

13. Device according to claim 5, where tools not relevant to a selected message format are displayed on a display of the electronic communication device but are not user selectable so that a user can continue to edit in the selected message format only.

14. Device according to claim 5, where the device is a portable electronic communication device.

15. Device according to claim 14, where the device includes at least one of a cellular phone, a PDA, or a smart-phone.

16. The method according to claim 1, where the particular message type comprises at least one of an Enhanced Message Service (EMS) message, a Multimedia Message Service (MMS) message, an electronic mail (e-mail) with attachment, an e-mail without attachment, or a blog message.

17. A method comprising:
   at a display of a communication device, displaying a message editor without requiring selection of a message type;
   via a first input unit of the communication device, receiving a message at the message editor;
   after receiving the message, displaying, at the display of the communication device, a plurality of selectable candidate message types for the message;
   receiving, via a second input unit of the communication device, a selection of a particular message type; and
   assigning the selected particular message type to the received message.

18. The method according to claim 17, where the plurality of selectable candidate message types are displayed in a scrollable menu.

19. The method according to claim 17, further comprising transmitting the message from the communication device in a transmission format based on the selected particular message type.

20. The method according to claim 1, where the plurality of message types includes an SMS message type.

* * * * *